United States Patent
Krinke, II et al.

(10) Patent No.: US 9,600,376 B1
(45) Date of Patent: Mar. 21, 2017

(54) BACKUP AND REPLICATION CONFIGURATION USING REPLICATION TOPOLOGY

(75) Inventors: Thomas L. Krinke, II, Forest Lake, MN (US); Donald James Stryker, Saint Paul, MN (US); Michael Lee Olofson, Elk River, MN (US); Raman Reet Sekhon, Blaine, MN (US)

(73) Assignee: Veritas Technologies LLC, Mountain View, CA (US)

( * ) Notice: Subject to any disclaimer, the term of this patent is extended or adjusted under 35 U.S.C. 154(b) by 323 days.

(21) Appl. No.: 13/539,618

(22) Filed: Jul. 2, 2012

(51) Int. Cl.
*G06F 12/00* (2006.01)
*G06F 11/14* (2006.01)

(52) U.S. Cl.
CPC ...... *G06F 11/1464* (2013.01); *G06F 11/1456* (2013.01); *G06F 11/1458* (2013.01)

(58) Field of Classification Search
CPC ............ G06F 11/1456; G06F 11/1469; G06F 11/1461; G06F 11/1458; G06F 17/30212; G06F 11/1464
See application file for complete search history.

(56) References Cited

U.S. PATENT DOCUMENTS

| | | | | |
|---|---|---|---|---|
| 7,447,857 | B2* | 11/2008 | Lyon .................. | G06F 11/1453 707/999.202 |
| 7,657,578 | B1* | 2/2010 | Karr et al. .................... | 707/610 |
| 7,904,679 | B2* | 3/2011 | Stager et al. ................. | 711/162 |
| 8,074,101 | B1* | 12/2011 | Vohra et al. .................. | 714/5.1 |
| 8,244,998 | B1* | 8/2012 | Krinke, II .......... | G06F 11/1464 711/161 |
| 8,380,951 | B1* | 2/2013 | Krinke, II .......... | G06F 11/1458 711/161 |
| 2004/0088379 | A1* | 5/2004 | Aoshima et al. ............. | 709/219 |
| 2007/0276884 | A1* | 11/2007 | Hara et al. .................... | 707/204 |
| 2007/0277012 | A1* | 11/2007 | Hara .................. | G06F 11/1448 711/162 |
| 2007/0294321 | A1* | 12/2007 | Midgley et al. .............. | 707/204 |
| 2008/0294859 | A1* | 11/2008 | Nguyen ........................ | 711/162 |
| 2009/0182963 | A1* | 7/2009 | Prahlad et al. ............... | 711/162 |
| 2010/0082925 | A1* | 4/2010 | Irisawa et al. ................ | 711/162 |
| 2010/0122053 | A1* | 5/2010 | Prahlad et al. ............... | 711/162 |
| 2010/0332454 | A1* | 12/2010 | Prahlad et al. ............... | 707/654 |

OTHER PUBLICATIONS

M. Kaczmarski, T. Jiang, D.A. Pease, "Beyond backup toward storage management" IBM Systems Journal vol. 42, No. 2 2003.*

* cited by examiner

*Primary Examiner* — David X Yi
*Assistant Examiner* — Francisco Grullon
(74) *Attorney, Agent, or Firm* — Campbell Stephenson LLP

(57) ABSTRACT

Various systems and methods for configuring backup and replication operations. For example, a method involves a backup system receiving storage configuration information regarding a replication topology of a storage system. The backup system uses the storage configuration information to configure a backup operation. The backup operation is configured in accord with specifications included in backup information. Configuring the backup operation includes selecting a source volume and a target volume, using the storage configuration information. Once the backup operation is configured, the backup operation is initiated. Performing the backup operation involves creating a backup image on the selected source volume and replicating the backup image to the selected target volume.

21 Claims, 12 Drawing Sheets

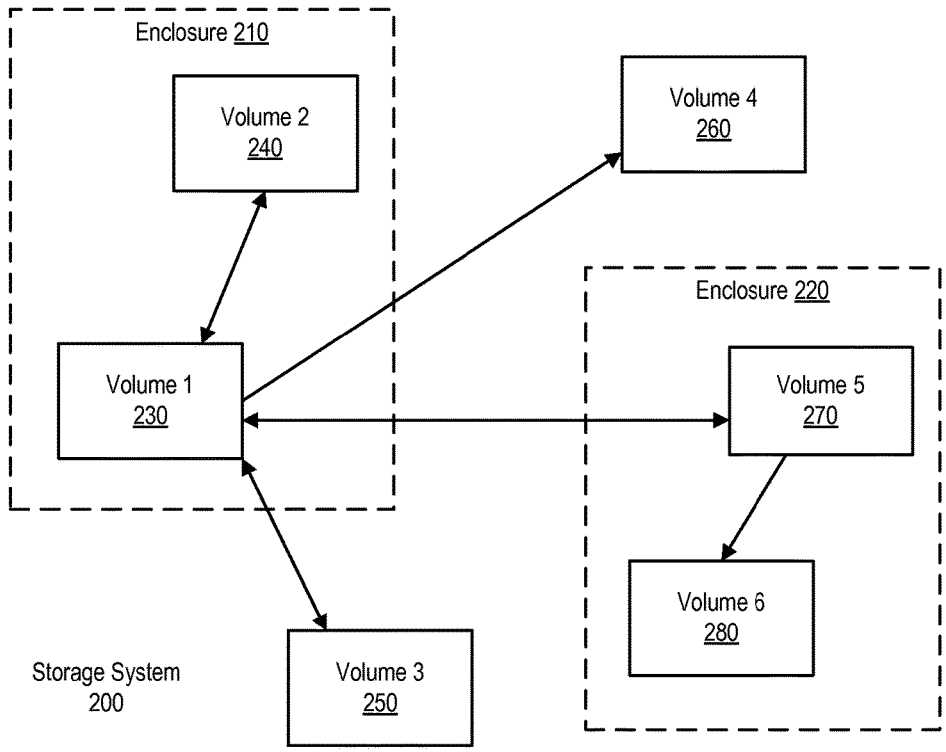

*FIG. 2A*

| Source | Target | Replication Type | Replication Quality |
|---|---|---|---|
| Volume 1 | Volume 2 | Two-way mirror | Synchronous |
| | Volume 3 | Two-way mirror | Synchronous |
| | Volume 4 | One-way mirror | Asynchronous |
| | Volume 5 | Two-way mirror | Synchronous |
| Volume 2 | Volume 1 | Two-way mirror | Synchronous |
| Volume 3 | Volume 1 | Two-way mirror | Synchronous |
| Volume 4 | | | |
| Volume 5 | Volume 1 | Two-way mirror | Synchronous |
| Volume 5 | Volume 6 | One-way mirror | Synchronous |
| Volume 6 | | | |

*FIG. 2B*

BACKUP AND REPLICATION CONFIGURATION USING REPLICATION TOPOLOGY

FIELD OF THE INVENTION

This invention relates to data storage and, more particularly, to configuring and executing backup and replication operations.

DESCRIPTION OF THE RELATED ART

In order to protect data from data loss, data can be backed up. In the simplest sense, backing up data involves creating a copy of data stored by a first storage device and storing the copy of the data in a second storage device. For example, a copy of data stored on a computer's hard disk can be stored on an external hard disk, or on a tape drive.

Data protection can be much more involved than the simple example above. Creating backups can involve various data protection requirements for different data. Backing up data can also involve transferring data between multiple physical sites, each of which can be managed by different entities. The degree to which a given storage device is able to satisfy a given data protection requirement can vary from storage device to storage device. For example, if a user specifies that an application be recoverable using backup data within a specific amount of time, some storage devices may be accessible in a short enough amount of time to satisfy the requirement, while others are not.

Detecting which storage devices can satisfy given data protection requirements can be challenging. This task can be especially complicated when the storage devices are managed by separate entities that do not communicate well with each other.

BRIEF DESCRIPTION OF THE DRAWINGS

The present invention may be better understood, and its numerous objects, features and advantages made apparent to those skilled in the art by referencing the accompanying drawings.

FIG. 2A is a block diagram illustrating a storage system, according to one embodiment of the present invention.

FIG. 2B is a replication topology map, according to one embodiment of the present invention.

Figure 1:
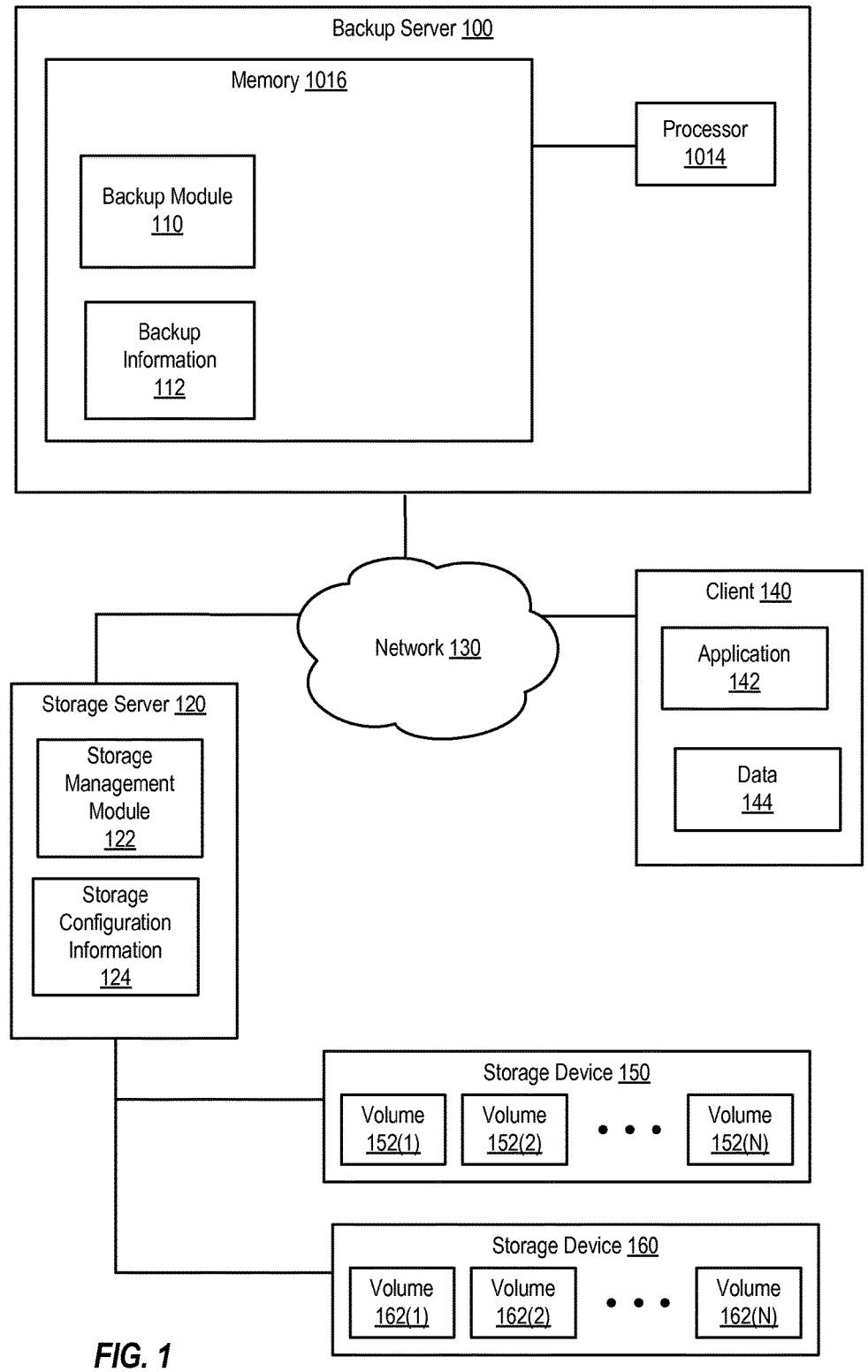
FIG. 1 is a block diagram of a system that can perform backup and replication operations, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

To backup data, a user, e.g., a backup administrator, employs a backup system. A backup system typically includes software and/or hardware designed to facilitate data protection by creating one or more backup copies of data. The capability and complexity of backup systems can varies widely from simple consumer backup systems to complex backup systems designed to provide data protection for worldwide enterprises. The difficulty associated with configuring a backup system likewise varies, depending on the backup system's complexity and the specifications of the users whose data is to be protected.

A given backup system can be capable of backing up data on one or more physical levels and/or on one or more logical levels. For example, a user can specify a range of addresses of physical locations, e.g., extents, of a physical storage device, e.g., a disk drive. In response to receiving the specified addresses, a backup system can backup data stored at the addresses. A backup system can also backup data based on a logical organization of data, such as one or more volumes, one or more applications or suites of applications, and/or one or more particular types of data. For example, a user can specify a file name. In response to receiving the specified file name, the backup system can back up the data that makes up the file.

A given backup system can also be capable of providing multiple levels of data protection. For example, a user can specify whether data should be synchronously mirrored or asynchronously mirrored, or whether the data should be backed up to a disk drive, to tape, or both. The length of time the data should be persisted, the frequency of creating new backups, and the number of copies of the data the backup system should create are additional examples of variables that affect how a backup system protects data. These variables can be configured by a user, e.g., a backup administrator, of the backup system.

One general characteristic of a backup operation is that the backup operation includes a source, where the data to be backed up is stored, and one or more targets, where the backup data will be stored. However, in conventional backup systems, it is difficult or impossible for a backup administrator to determine, a priori, whether a target is capable of satisfying any or all criteria associated with backing up a given portion of data. This difficulty stems from the backup administrator having incomplete information about some or all elements of the backup system.

For example, a user can specify that backup operation should include backing up data to a first storage device and replicating the backed up data from the first storage device to one or more secondary storage devices. If the first and secondary storage devices are managed by entities other than the backup system, such as storage managers, the backup administrator may not be capable of determining the operating characteristics, such as capacity and connectivity, of the secondary storage devices. This may prevent the backup administrator from being able to select secondary storage devices that are capable of successfully meeting the user's specifications.

If the backup administrator is unable to view and build upon a topology represented by the storage devices, misconfigurations are more likely to occur. It is desirable to simplify the configuration of local and remote storage devices that share replication relationships in order to prevent misconfigurations and increase the likelihood of successful completion of backup and replication operations. Backup administrators work closely with storage administrators to prevent and/or mitigate such problems. However such interactions can be time consuming and can not only place a burden on the availability of the administrators, but can reduce the speed, accuracy, and efficiency of backup operations.

The systems and methods described herein are configured to ameliorate the problems discussed above. A method is described in which storage system configuration information is provided to a backup system. This allows the backup system to make informed decisions when configuring backup operations. For example, the backup system can determine which storage devices are configured to replicate to each other and select storage devices for back up data based on the replication requirements of a given backup operation. Basing backup configuration decisions on known storage system configuration greatly expedites the process of configuring backup operations, as well as improving the actual performance of the backup operations. That is, if a backup operation is configured to optimally utilize an underlying storage system configuration, based on information regarding the underlying storage system's configuration, the backup operation is likely to experience fewer delays due, for example, to transmission delays and/or failures related to poorly chosen storage devices.

FIG. 1 is a block diagram of a system that is capable of performing backup and replication operations. The system of FIG. 1 is configured to utilize replication topology information of an underlying storage system to configure backup and replication operations. As shown, the system includes a backup server 100, a storage server 120, a client 140, a storage device 150, and a storage device 160. Backup server 100, storage server 120, and client 140 are coupled to one another by network 130. Network 130 can include a WAN (Wide Area Network), such as the Internet, one or more LANs (Local Area Networks), and/or one or more SANs (Storage Area Networks).

Backup server 100 is a computing device such as a personal computer, laptop computer, server, personal digital assistant, cell phone, or the like. As shown, backup server 100 includes backup module 110. Backup module 110 is configured to execute backup operations in which a copy of data, such as data 144 is created and stored in a storage device, such as storage device 150. The backup operation may also involve replicating the data to another storage device, e.g., replicating the backed up data 144 from storage device 150 to storage device 160.

Backup module 110 is configured to execute any type of backup operation, including full backups or incremental backups. A full backup involves backup module 110 creating a complete copy of data, such as data 144, and storing the complete copy in storage device, such as storage device 150. An incremental backup involves backup module 110 identifying data that has been changed since a previous backup operation and copying only the changed data to a storage device. Backup module 110 is also capable of performing physical or logical backups. Backup module 110 is able to perform backup operations at one or more of multiple levels, such as at a file level and/or at a volume level.

A backup operation, as performed by backup module 110, may include backing up and replicating data. Backing up data typically involves creating a backup image that includes a backup copy of data and storing the backup image in a storage device. Replicating the backed up data typically involves creating a copy of the backup image and storing the copy in one or more additional storage devices. For example, backup module 110 can backup client 140. Client 140 is a computing device such as a personal computer, laptop computer, server, personal digital assistant, cell phone, or the like. Client 140 includes application 142 and data 144. Application 142 can be any of a word processing program, email program, graphic editing program, database application, server program, or the like, and can read from and/or write to data 144. Data 144 represents one or more of any logical or physical unit of data, such as a file system, a file, a database, a volume, a block, a disk drive, or the like. One or more applications, such as application 142, are configured to access data 144. In order to backup client 140, backup module 110 creates a backup image that includes some or all of data 144, application 142, and/or data associated with client 140, such as an operating system, metadata, and the like. Backup module 110 is configured to store the backup image in a storage device, such as storage device 150, and replicate the backup image to an additional storage device, such as storage device 160.

Backup module 110 is configured to receive and store, e.g., in backup information 112, one or more specifications for performing backup operations. For example, a user, e.g., a backup administrator, can configure a storage lifecycle policy (SLP) and transmit the SLP to backup module 110, which can store the SLP in backup information 112. In one embodiment, backup module 110 can cause a user interface to display a number of configurable options and receive a user's selection of the various options to configure a backup operation. Backup module 110 can also automatically generate one or more parameter values associated with a backup operation based, for example, on one or more business rules stored in backup information 112.

Backup module 110 uses backup information 112 to configure a backup operation. Configuring a backup operation can involve specifying values for a number of options, such as what data is to be backed up, the type of backup operation, the frequency of backing up the data, a storage location where the data is to be stored, and the like. A user is able to select one or more predefined SLPs that includes a set of parameter values for some or all of the options. The user can manually select parameter values, or a combination of automatic and manual configuration can be used.

Part of configuring a backup operation may involve configuring one or more replication operations. As part of performing a backup operation, or subsequently to performing a backup operation, the backed up data, e.g., a backup image, may be replicated to one or more storage devices, such as storage device 160. Such storage devices are typically included in an independently managed underlying storage system. A replication operation involves one or more replication source volumes, e.g., volume 152(1) and one or more replication target volumes, e.g., volume 162(1). A replication source volume is a volume from which data can be copied and a replication target volume is a volume to which data can be copied. In order for a replication operation to successfully complete, the underlying storage system should include connections between volumes to support the source and target designations specified in the replication operation. That is, if a backup administrator configuring a replication operation specifies a first volume as a replication source volume and a second volume as a replication target volume, but the first and second volumes are not configured to enter a replication relationship, e.g., the volumes are not actually communicatively coupled, the replication operation will likely fail.

Storage server 120 is a computing device such as a personal computer, laptop computer, server, personal digital assistant, cell phone, or the like. As shown, storage server 120 includes storage management module 122. Storage management module 122 is configured to manage one or more storages systems, such as storage devices 150 and 160. Managing a storage system involves, for example: creating logical groupings; setting permissions; controlling access; organizing data; and monitoring and reporting on the health, utilization, and availability of the storage devices included in the storage system. Storage management module 122 is also configured to store information regarding the storage systems managed by storage management module 122 in storage configuration 124. Such information typically includes, for example, information regarding the configuration, capabilities, and utilization of the storage systems, and the storage devices therein.

Storage devices 150 and 160 provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

As shown, storage devices 150 and 160 include volumes 152(1)-152(N) and 162(1)-162(N), respectively. It will be noted that the variable identifier "N" is used to more simply designate the final element of a series of related or similar elements (e.g., backup clients). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

A volume is a logical storage unit (LSU) configured to store data, such as application data 144. A volume can have a fixed or variable size. The size can be arbitrary or can be dependent on underlying physical hardware characteristics. Each volume can be configured, e.g., by storage management module 122, to have zero or more replication sources. That is, storage management module 122 can configure a volume such that the volume is capable of receiving replicated data from one or more other volumes. Storage management module 122 can also configure the volume to have one or more replication targets. That is, the volume can replicate data to one or more replication targets.

A volume can have one or more of the following properties: the volume can be a primary volume; the volume can be capable of holding snapshot images; the volume can be configured to store mirror images; the volume can be configured to store independent images; the volume can be configured to act as a replication source; the volume can be configured to act as a replication target. For each volume in a storage system, storage management module 122 can set a flag for each of the above properties indicating which properties apply for the volume. To discover which properties apply for a given volume, storage management module 122 can query, e.g., using an API, a storage device in which the volume is included. In response to the query, storage management module receives the configuration information for the volume, as well as configuration information for any other volumes and/or groups of volumes included in the storage device. Storage management module can store this information in storage configuration information 124.

Storage management module 122 collects multiple volumes into one or more groups of volumes, e.g., a disk pool. In one embodiment, all volumes within a group of volumes are configured to be homogenous with respect to the configuration flags. That is, storage manager 122 ensures that each volume has the same flags set as every other volume in the group. In this embodiment, storage manager 122 does not include volumes with different flags set in the same group. Backup module 110 can select a group as a replication source or target. The homogeneity of the volumes in a group ensures that the volumes in the group are configured to be able to successfully complete a given replication operation for which the group is selected. Without this homogeneity, the case could arise in which some volumes in a group were able to successfully complete a replication operation, while other volumes in the group were unable to successfully complete a replication operation, due to differences in the configuration of the other volumes.

A replication topology includes a group of storage devices, e.g., volumes, in a storage system, particularly as the volumes are coupled and configured to serve as replication sources and/or targets. Information such as which replication properties apply to which volumes and which volumes are grouped together is replication topology information. Replication topology information is maintained, e.g., by storage management module 122, in storage configuration information 124. Backup module 110 is capable of configuring backup operations, e.g., by selecting volumes that are available for backup and replication operations, groups of such volumes, and SLPs, based on the replication topology of the storage system. The replication topology can be presented to backup module 110 to assist in the configuration and selection of source and target objects for replication.

The replication topology information presented to the backup administrator includes information identifying a replication source or replication target. For example, if a replication source or replication target is a volume, the replication topology information includes the name of the storage device that includes the volume. Additional information about the storage device and the volume can also be included, such as the type of the storage device that contains the volume, configuration of the storage device, capacity of the storage device, the name volume, and the like. Backup module 110 is configured to query storage management module 122 to retrieve the replication topology information. In response to receiving the replication topology information, backup module 110 stores the replication topology information in a database or other data structure, e.g., in backup information 112.

Backup module 110 is configured to use the replication topology information received from storage management module 122, and stored in backup information 112, to configure backup module 110 to perform backup operations. Since the backup module has access to the replication topology information, the backup module can select replication sources and targets based on this replication topology information. In one embodiment, backup module 110 automatically selects replication source/target pairings based on the replication topology information. Backup module 110 can then execute a backup operation using the replication sources and targets selected based upon the replication topology information.

FIG. 2A is a block diagram illustrating a storage system 200. The storage system of FIG. 2A can be used by a backup module, such as backup module 110 of FIG. 1, to perform backup operations. While storage system 200 is shown in terms of enclosures and volumes, such a depiction is meant to be illustrative only, and so it will be apparent, in light of the present disclosure, that the storage system can be implemented equally well using various other types and combinations of storage devices and entities, such as storage servers, disk pools, disk drives, and the like.

As shown, the storage system includes enclosure 210, enclosure 220, volume 1 230, volume 2 240, volume 3 250, volume 4 260, volume 5 270, and volume 6 280. Each of the volumes and enclosure can be located at a single physical site. Alternatively, the volumes and enclosures can be located at multiple physical sites. The volumes and enclosures shown in FIG. 2A can be managed by one or more storage management modules, such as storage management module 122 of FIG. 1. In one embodiment, enclosures are managed as single storage entities, and the volumes in an enclosure form part or all of a group with each volume in a given enclosure being configured identically as each other volume in the group.

The storage management module is able to modify the configuration of the volumes and replication relationships between the volumes. The arrows shown in FIG. 2A depict replication relationships between the volumes. As indicated by the arrowheads, volume 1 is in a two-way replication relationship with volume 3. That is, volume 1 is configured to act as a replication source to volume 3, volume 3 is configured to act as a replication target to volume 1, volume 3 is configured to act as a replication source to volume 1, and volume 1 is configured to act as a replication target to volume 3. A one-way replication relationship exists between volume 1 and volume 4, as indicated by the arrowhead. That is, volume 1 is configured to act as a replication source to volume 4, volume 4 is configured to act as a replication target to volume 1. However, volume 4 is not configured to act as a replication source to volume 1, and volume 1 is not configured to act as a replication target to volume 4.

As shown in FIG. 2A, a volume can have a replication relationship with more than one other volume. For example, volume 1 is configured to act as a replication source for volume 2, volume 3, volume 4, and volume 5. Volume 1 is also configured to act as a replication target for volume 2, volume 3, and volume 5.

A storage management module managing the volumes of storage system 200 processes reads and writes to the volumes. For example, a backup module configured to backup data to storage system 200 specifies that a backup image is to be stored at volume 1 and replicated to volume 3. The storage management module issues commands to volume 1 and volume 3 to write the data to the volumes. In one embodiment, the backup module specifies that the backup image is to be stored and replicated without specifying which volumes are to be used. The storage management module can automatically select appropriate volumes based on the storage system configuration, for example, utilization and other storage configuration information, such as storage configuration information 124 of FIG. 1.

The storage management module determines which volumes are capable of acting as sources and targets and establishes the replication relationships between volumes. The storage management module collects configuration information from each volume. The storage management module uses the configuration information to generate a replication topology map, as discussed with regard to FIG. 2B. The storage management module can transmit the replication topology map to the backup module, and the backup module can select which volumes to include in backup operations based on the information in the replication topology map. For example, if the backup module detects that a backup image is to be stored on volume 1 and replicated to another volume, the backup module can make a determination as to whether a replication relationship exists between volume 1 and volume 6. If no such replication relationship exists, the backup module can use the replication topology map to select a volume that is configured to act as a replication target for volume 1, rather than selecting volume 6 as the replication target for the backup image on volume 1.

FIG. 2B illustrates a replication topology map. A storage management module, such as storage management module 122 of FIG. 1, can generate the replication topology map and transmit the replication topology map to a backup module, such as backup module 110 of FIG. 1.

As shown, the replication topology map includes information identifying the replication relationships between the volumes of the storage system shown in FIG. 2A. The map can be generated by the storage management module, where the storage management module manages one or more of the volumes. The storage management module can also receive information from one or more other storage management modules and add the information to the replication topology map.

The replication topology map shows which volumes are configured to act as source and target for which other volumes. The replication topology map also shows the type of replication relationship that is established, e.g., by the storage management module, between the source volumes and target volumes. In addition to the information shown, the replication topology map can include additional information about the replication topology. For example, the replication topology map can include information identifying the names of the enclosures, the available amount of storage, the total amount of storage, additional configuration information and/or metadata associated with the volumes, and the like.

Figure 3:
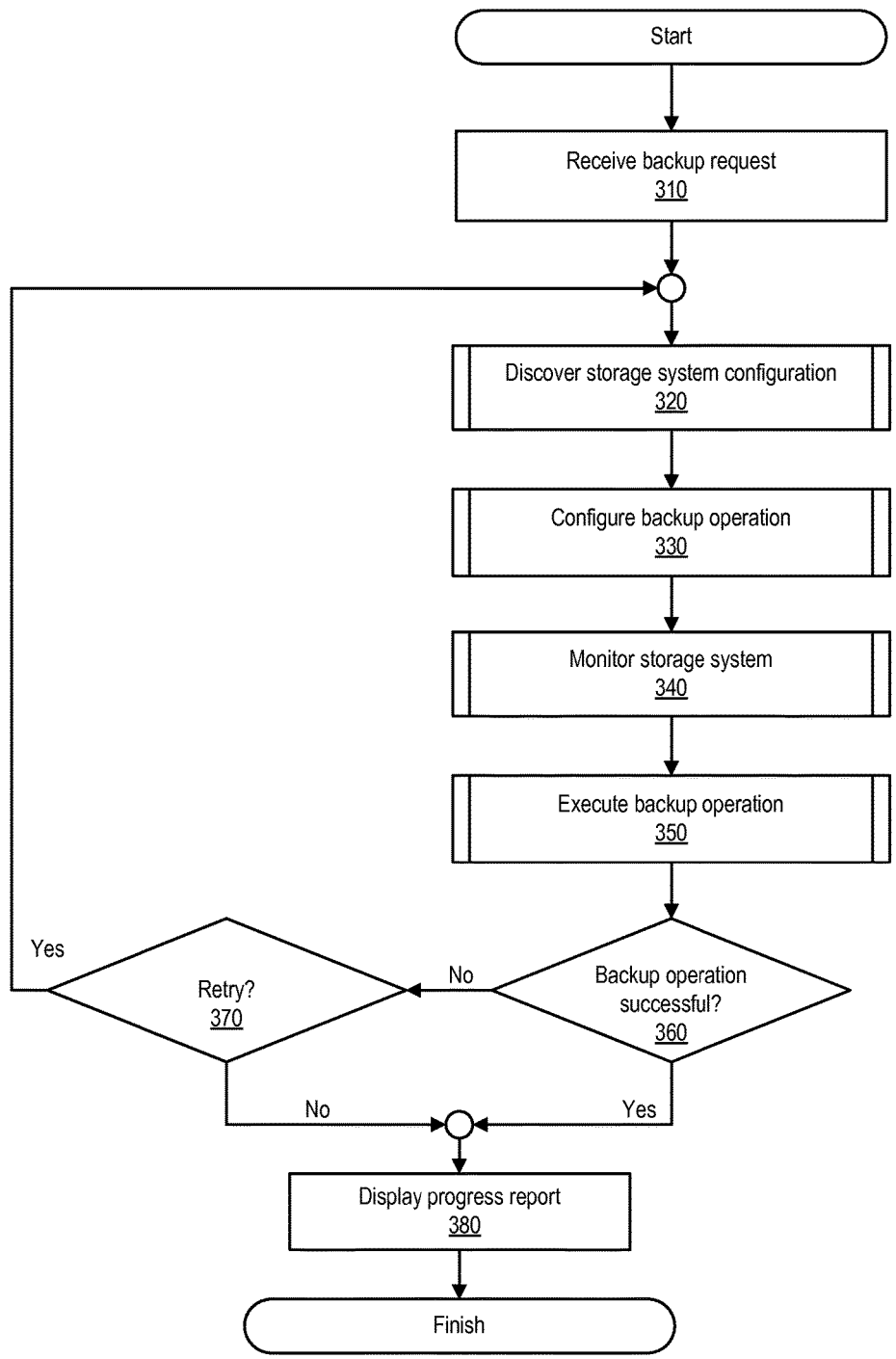
FIG. 3 is a flowchart of a method of performing a backup operation, according to one embodiment of the present invention.

FIG. 3 is a flowchart of a method of performing a backup operation. The method can be performed by a backup module, such as backup module 110 of FIG. 1. The backup operation can involve the backup module creating a backup image comprising a copy of data, such as data 144 of FIG. 1, storing the backup image at a first volume, and replicating the backup image to one or more additional volumes.

The backup module receives a backup request at 310. The backup module can receive the request in the form of user input via a user interface, for example. The request identifies a backup operation to be performed and can include information identifying the data to be backed up, e.g., an application name. The request can also include information specifying one or more values indicating the manner of backup operation that is to be performed on the data. For example, a user can specify that an incremental backup be performed on a volume at a specified periodic interval. The user can specify a service level and the backup module can detect and apply parameter values associated with the service level. The backup module can automatically initiate a backup operation. In one embodiment, the backup module automatically initiates a backup operation in response to detecting the occurrence of some condition, or satisfaction of a specified criterion, e.g., in response to detecting expiration of a pre-specified time interval.

At 320, the backup module discovers storage system configuration information. As discussed in more detail with regard to FIG. 4, discovering storage system configuration information can involve receiving information from a storage management module, such as storage management module 122 of FIG. 1, which identifies characteristics of storage entities included in one or more storage systems, including information regarding a replication topology of the storage entities.

The backup module configures the backup operation to be performed at 330. As discussed in more detail with regard to FIG. 5, configuring a backup operation can involve using information received from a storage management module to associate one or more replication sources with one or more replication targets.

At 340, the backup module monitors the storage system. As discussed in more detail with regard to FIG. 6, monitoring a storage system can involve interacting with the storage management module to detect when changes occur that could affect a backup operation, e.g., replication topology changes.

The backup module executes the backup operation at 350. As discussed in more detail with regard to FIG. 7, executing a backup operation can involve generating commands that cause a backup image to be created, stored, and/or replicated.

At 360, the backup module detects whether the backup operation was successful. This involves the backup module detecting whether the backup image was created, stored, and/or replicated. Any of these operations can return an error if there is a problem completing the operation. For example, the backup module can detect that a lock held on data is released prematurely, causing the backup module to be unable to create a backup image. A loss of connectivity between storage devices causes the backup module to detect that the backup image cannot be stored in the intended storage device. The backup module can detect that a volume's configuration has changed and the volume can no longer serve as a replication target, causing the replication operation to fail. In any of these cases, or in similar cases in which the backup operation failed to complete, the backup module can detect that the backup operation was not successful.

In response to detecting that the backup operation was not successful, the backup module detects, at 370, whether the backup module should retry the backup operation. This can involve reading a pre-specified value, e.g., a number of times to retry. In one embodiment, the backup module prompts a user for instructions on whether the backup operation should be retried, e.g., using a dialog box in a graphical user interface. In response to detecting that the backup operation should be retried, the method returns to 320.

In response to detecting that the backup operation succeeded, or that a failed backup operation should not be retried, e.g., due to exceeding the pre-specified number of retries, the backup module displays a progress report, at 380. The progress report can include information indicating whether the backup operation completed successfully, and how many tries were performed. In one embodiment, the backup module can display a progress report concurrently with execution of the backup operation, indicating that the backup operation is ongoing and optionally displaying a progress indicator, e.g., in terms of percent complete and/or estimated time to complete the backup operation.

Figure 4:
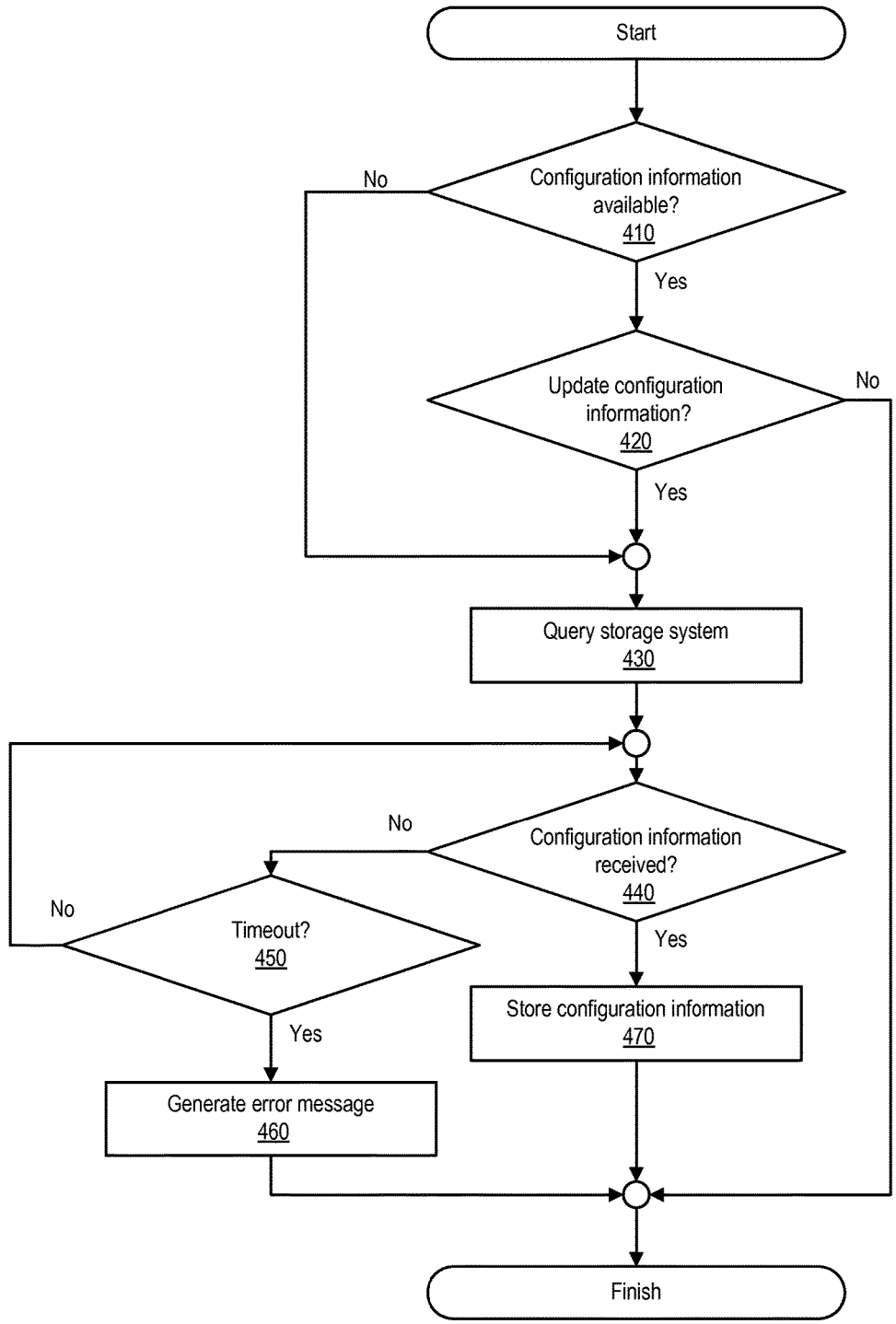
FIG. 4 is a flowchart of a method of discovering storage system configuration information, according to one embodiment of the present invention.

FIG. 4 is flowchart showing additional details of a method of discovering storage system configuration information. The method can be performed by a backup module, such as backup module 110 of FIG. 1.

At 410, the backup module detects whether storage system configuration information is available. In one embodiment, the backup module queries a storage management module, such as storage management module 122 of FIG. 1. The backup module can also query multiple storage management modules and receive information regarding multiple storage systems. In response to the query, the backup module receives and displays a list of replication targets and a list of replication sources for each volume specified by the query or for each volume included in one or more storage devices managed by the storage management module. This list is subject to change, for example, in response to detecting that the storage administrator has modified a volume's replication sources or replication targets, or other configuration information associated with a volume. In one embodiment, the storage management module automatically communicates this information, e.g., via an update message, to the backup module without receiving a query from the backup module.

In one embodiment, the backup module detects configuration information at device configuration time. That is, the backup module queries for this information in response to the backup module being installed and initially set up by a backup administrator, or in response to the backup module detecting additional storage devices being added to a storage system. The backup module stores the configuration information in a database, e.g., in backup information 112 of FIG. 1. The backup module can also query periodically, or in response to detecting that a criterion or condition is satisfied, e.g., in response to detecting a replication topology change.

In response to detecting that a volume is added to or deleted from the storage system, the backup administrator can manually update storage configuration information, e.g., manually add or delete the volume to/from the appropriate disk pools. Alternatively, the change in storage topology can be automatically reflected in the disk pools. In one embodiment, the backup module warns the backup administrator if the backup administrator attempts to delete a volume from a disk pool if the volume includes valid backup data. In one embodiment, the backup module prevents the delete from completing.

If a replication source or target is changed, the backup module refreshes the storage configuration information to reflect the changed volumes. Failure to do so can result in failed replication operations.

Configuration information for a volume includes, for example, the values for one or more of several available flags that indicate how the volume can be used in replication operations. For example, a volume that is configured to be a replication source has the replication source flag set. A volume configured to act as a replication target has the replication target flag set. A volume from which snapshot data can be taken has the primary flag set. A volume configured to store snapshot data has the snapshot flag set, as well as the replication source flag and the replication target flag. Additional flags include the mirror flag, which is set if the volume is configured to operate as a mirror volume, and the independent flag, which is set if the volume is configured to store independent backup image data, and the flexible flag, which is set to indicate that the volume is configured to store mirror and independent backup data.

At 420, the backup module detects whether storage system configuration information should be updated. In one embodiment, the backup module does not update configuration information in response to detecting configuration changes that do not affect backup operations. For example, if a volume is added to a storage system, but the volume is not configured to act as a replication source or replication target, the backup module can avoid updating the configuration information since the added volume will not be used by the backup module to perform backup operations.

In response to detecting that storage system configuration information should be updated, the backup module queries the storage system, at 430. The backup module can query the storage management module for replication topology information using an application programming interface (API) designed for the purpose. The query can return, for example, the replication relationships of one or more volumes, both outgoing and incoming, as well as other configuration information regarding the volumes. The storage management module has knowledge of all the volumes that it can replicate to. The storage management module also knows about volumes replicating to its volumes. The backup module can therefore query the storage management module for information about the remote volumes it is connected to, both for outgoing and incoming replications.

At 440, the backup module detects whether updated storage system configuration information is received. The backup module can wait a predetermined amount of time to receive the configuration information before timing out. If the backup module detects a timeout at 450, the backup module can generate an error message at 460. In one embodiment, the backup module displays an error notification to a user indicating that the backup module was unable to retrieve storage system configuration information.

If the backup module is successful in obtaining storage system configuration information, the backup module stores the storage system configuration information at 470. This information can be persisted in a database and be used to configure the local disk pools, storage units and SLP policies.

Figure 5:
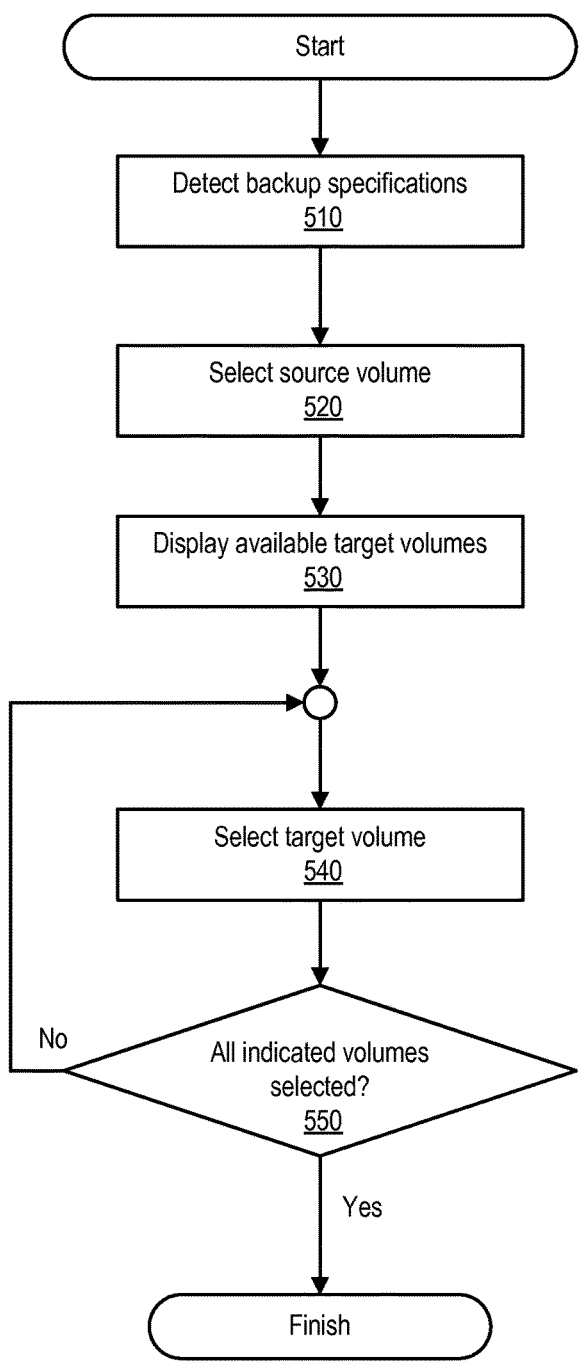
FIG. 5 is a flowchart of a method of configuring a backup operation, according to one embodiment of the present invention.

FIG. 5 is flowchart of a method of configuring a backup operation. The method can be performed by a backup module, such as backup module 110 of FIG. 1.

At 510, the backup module detects backup specifications. The backup module can receive information identifying data that is to be backed up, e.g., data 144 of FIG. 1. The backup module can also receive information identifying the type of backup, e.g., full or incremental, and one or more quality of service parameter values, e.g., whether the data is to be replicated, a priority associated with the backup operation, how long the backed up data is to be persisted, frequency of backup (if the backup is recurring), and the like. The specifications can also include data processing information, such as whether and what type of compression, encryption, deduplication, and the like, should be applied to the backed up data. In one embodiment, a user selects an SLP, and the backup module detects the backup operation specifications based on the SLP. Alternatively, the backup module can automatically detect the specifications based, for example, on a characteristic of the data or the user that is requesting the backup operation. For example, the backup module can detect that the data being backed up is file data that has been recently modified. Based on one or more business rules, e.g., stored in backup information 112 of FIG. 1, the backup module can detect that recently modified file data is always backed up according to a predetermined set of specifications.

The backup module selects, at 520, a source volume. The source volume contains data that is to be replicated from one or more volumes to another one or more volumes. The backup module can select a source volume in response to receiving, e.g., at 510, information identifying the source volume. In one embodiment, the backup module can automatically detect the location of data, e.g., an application selected to be included in a backup operation, e.g., application 142 of FIG. 1. The backup module can select units of data storage other than a volume, e.g., a group of volumes, or a storage server, as the source volume.

At 530, the backup module displays available target volumes. Based on storage configuration information received from a storage management module, such as storage management module 122 of FIG. 1, the backup module can identify one or more target volumes that are configured to be capable of acting as a replication target for the source volume. The backup module can create a list of candidate source volumes and display the list, e.g., via a graphical user interface. The list can be stored in a file, e.g., in the backup information available to the backup administrator.

A valid replication target for a storage unit (e.g., a volume) or group is a storage unit, or group, for which replication can succeed. A storage unit is a valid replication target for a given source storage unit if the target storage unit contains one or more target volumes for each volume in the source storage unit.

In one embodiment, detecting whether a given volume is a valid replication target involves the backup module accessing configuration information about the candidate replication target, as well as configuration information the replication source. For example, the backup module can detect whether the replication source is configured to act as a replication source, e.g., has a replication source flag set and whether the replication source has at least one replication target defined. The backup module can also detect whether the candidate target storage unit's snapshot flag matches the replication source's snapshot flag. That is, the backup module detects whether both the replication source and the replication target are snapshot capable storage units or whether both the replication source and the replication target are not snapshot capable. The backup module also detects whether the candidate replication target has a replication target flag set.

The backup module can sort and/or filter the source volume candidates, e.g., based on performance capabilities and/or utilization. For example, if the storage configuration information indicates that a candidate source volume has a 500 GB total capacity, of which 450 GB is used, leaving 50 GB free, the backup module can display the candidate source volume lower in a list of candidate source volumes than candidate source volumes with more than 50 GB free space.

The backup module selects, at 540, a replication target volume. A backup administrator can manually select one or more volumes as replication targets. Alternatively, the backup module can automatically select a replication target. The backup module can present information identifying the automatically selected volume(s) for review. In one embodiment, the backup administrator can approve, disapprove, or modify the information. That is, the backup administrator can approve some of the selected replication targets and disapprove some. The backup administrator can manually select targets to fill in the spots left by the disapproved replication targets, or the backup module can automatically present and/or select additional replication targets.

At 550, the backup module detects whether all indicated volumes are selected. For example, if the backup specifications received at 510 indicate that data should be replicated to multiple volumes, e.g., for additional redundancy, the backup module detects whether multiple replication target volumes have been selected such that the backup specifications are met.

If not, the method returns to 540, where the backup module selects an additional target volume. This process repeats until the backup specifications are satisfied. If a source storage device includes multiple volumes that replicate to a remote storage device that includes multiple volumes, then the search for a replication target storage device should identify storage devices that include multiple volumes. That is, if source data is configured in two separate volumes, the source data should still be in two separate volumes once replicated. If a potential target replication storage device only has one volume, the potential target replication storage device is not a good choice since replicating to that target replication storage device would require the source data being stored in a single volume. Since the source data is in two separate volumes on the source, the source data should be in two separate volumes in the target. Putting the data into one volume could have negative consequences. For example, the data in separate volumes can have the same name in each of the volumes. If placed into one volume, a conflict would exist. Another problem is that the data can be configured with different permissions, security, and the like. If the data goes into one volume, the ability to separately configure the permissions is lost. Similarly, concurrent access may be impaired if the data is placed in a single volume.

Figure 6:
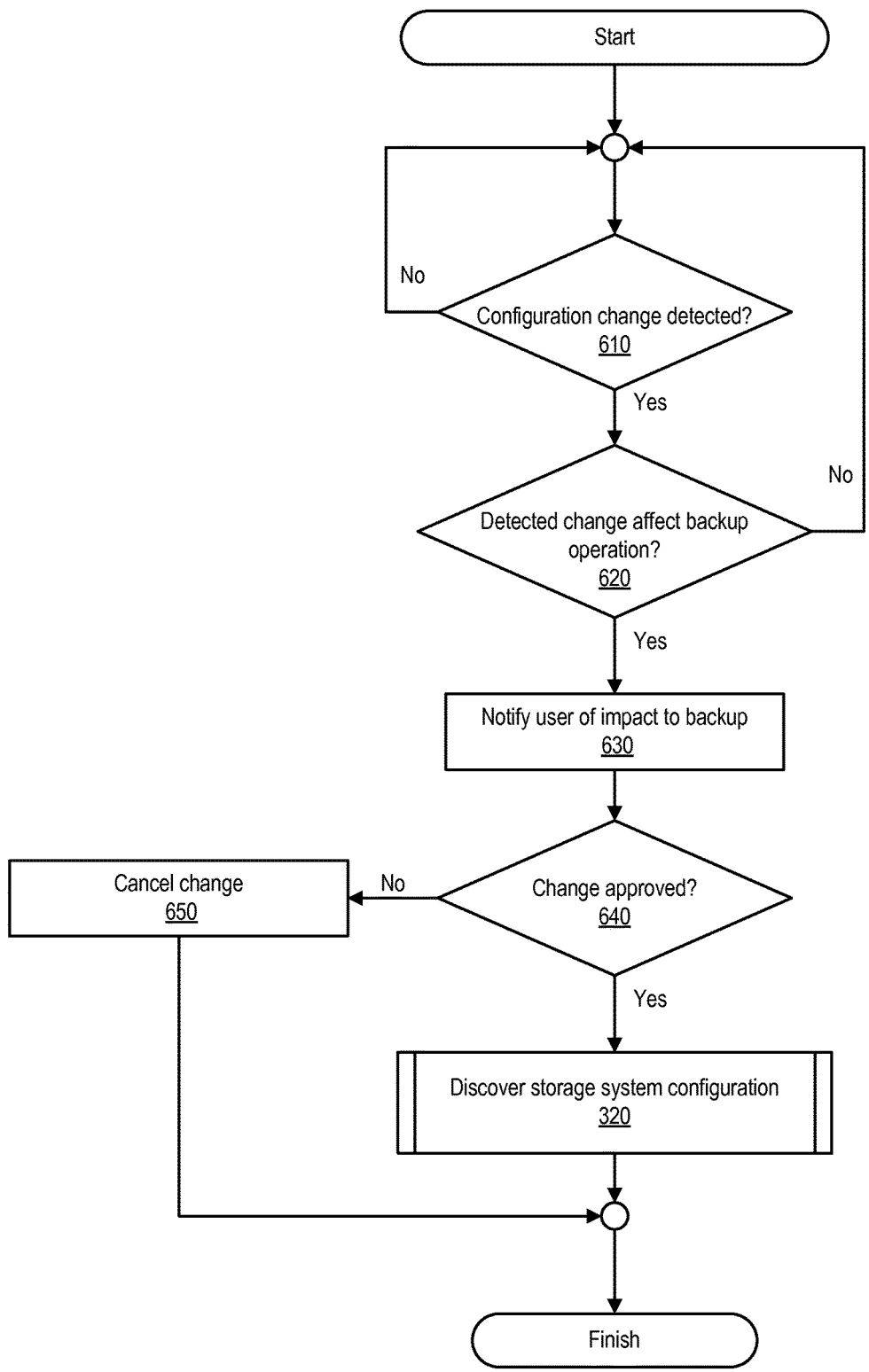
FIG. 6 is a flowchart of a method of monitoring a storage system, according to one embodiment of the present invention.

FIG. 6 is flowchart of a method of monitoring a storage system. The method can be performed by a backup module, such as backup module 110 of FIG. 1. Storage system monitoring can be configured to run in the background while the backup module performs other backup related activities, such as configuring and executing backup operations.

At 610, the backup module detects whether there has been a configuration change. Examples of configuration changes that the backup module can detect include adding or removing volumes to a storage system, grouping volumes, changing configuration values associated with a volume, and the like. In one embodiment, the backup module receives information from a storage management module, such as storage management module 122 of FIG. 1. The storage management module automatically detects and transmits such information to the backup module. In one embodiment, the backup module queries the storage management module on a periodic basis for configuration change information.

If the backup module detects a configuration change, the backup module detects, at 620, whether the configuration change affects backup operation. For example, if a backup operation is configured to replicate an application from a source volume to a given target volume, but the backup module detects that the given target volume is reconfigured, e.g., by the storage management module, to no longer act as a replication target to the source volume, the change would affect the backup operation. In one embodiment, the backup module only detects whether a configuration change affects backup operations that are actually scheduled and/or ongoing, e.g., backup operations that the backup module has already configured. The detecting involves comparing information identifying the configuration change with a list of ongoing and scheduled backup operations.

In response to detecting that a configuration change affects a backup operation, the backup module generates a notification so indicating, at 630. In one embodiment, the backup module causes a message to be displayed on a graphical user interface. The backup module can also suspend or terminate an ongoing or scheduled backup operation in response to detecting the configuration change.

In one embodiment, the backup module instructs the storage management module to disallow the change. This involves instructing the storage management module to undo the change. Alternatively, in one embodiment where the storage management module notifies the backup module of the change prior to executing the change, the backup module can instruct the storage management module to not execute the change. These operations are shown beginning at 640, where the backup module detects whether the change is allowed. In one embodiment, this involves requesting user input allowing or disallowing the change. In response to detecting that the change is not approved, the backup module instructs the storage management module to cancel the change, at 650.

In one embodiment, the backup module receives information that a change has occurred, but does not receive complete information regarding the change. In order to receive complete information regarding the change, the method returns to a discover storage system configuration operation 320, as discussed with regard to FIG. 3.

Figure 7:
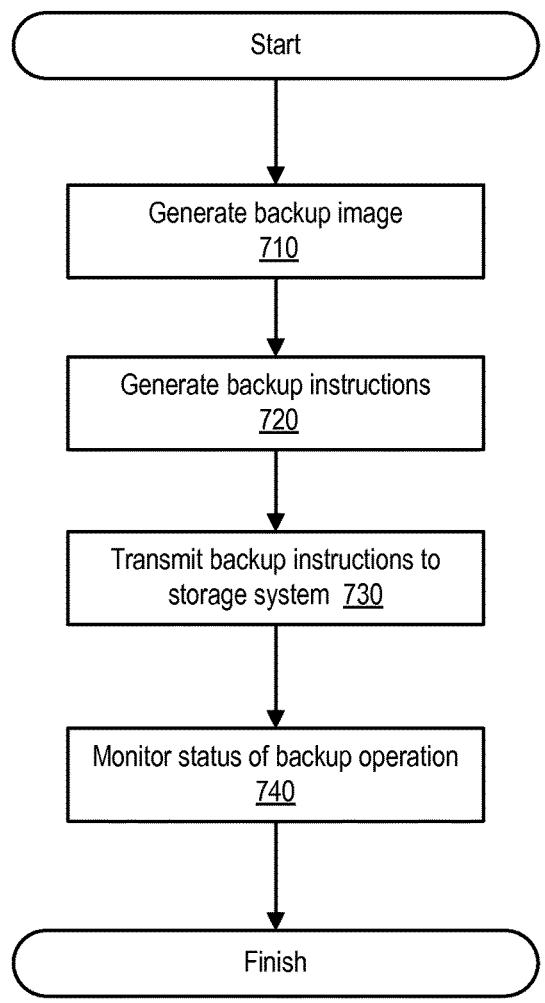
FIG. 7 is a flowchart of a method of executing a backup operation, according to one embodiment of the present invention.

FIG. 7 is flowchart of a method of executing a backup operation. The method can be performed by a backup module, such as backup module 110 of FIG. 1.

At 710, the backup module generates a backup image. The backup module can identify data specified by a user and the location of the data. The backup module can issue a command, e.g., to a storage management module such as storage management module 122 of FIG. 1, to create a backup image that includes a copy of the data.

The backup module generates backup instructions at 720. In one embodiment, the backup instructions include instruction to store a backup image at a first location. The instructions can also specify that the backup image is to be replicated to one or more replication targets. The replication targets can be selected based on the storage configuration information received by the backup module from the storage management module.

At 730, the backup module transmits backup instructions to the storage system that is to execute the backup instructions. In one embodiment, the backup module transmits the instructions to the storage management module that manages the storage system. The backup module monitors the status of the backup operation at 740. The storage management module can send an acknowledgement to the backup module in response to successfully completing the backup operation, or in response to receiving a query from the backup module, where the query requests information regarding the status of the backup operation. The acknowledgement can include information identifying whether the backup operation has completed successfully, has failed, or is in progress. If the backup operation is in progress, the acknowledgment can indicate the degree of completion, e.g., in terms of percent complete, and estimated time remaining to complete. In the case of the backup operation failing, the acknowledgement can include information indicating the reason for failure, e.g., a storage system configuration change.

Figure 8:
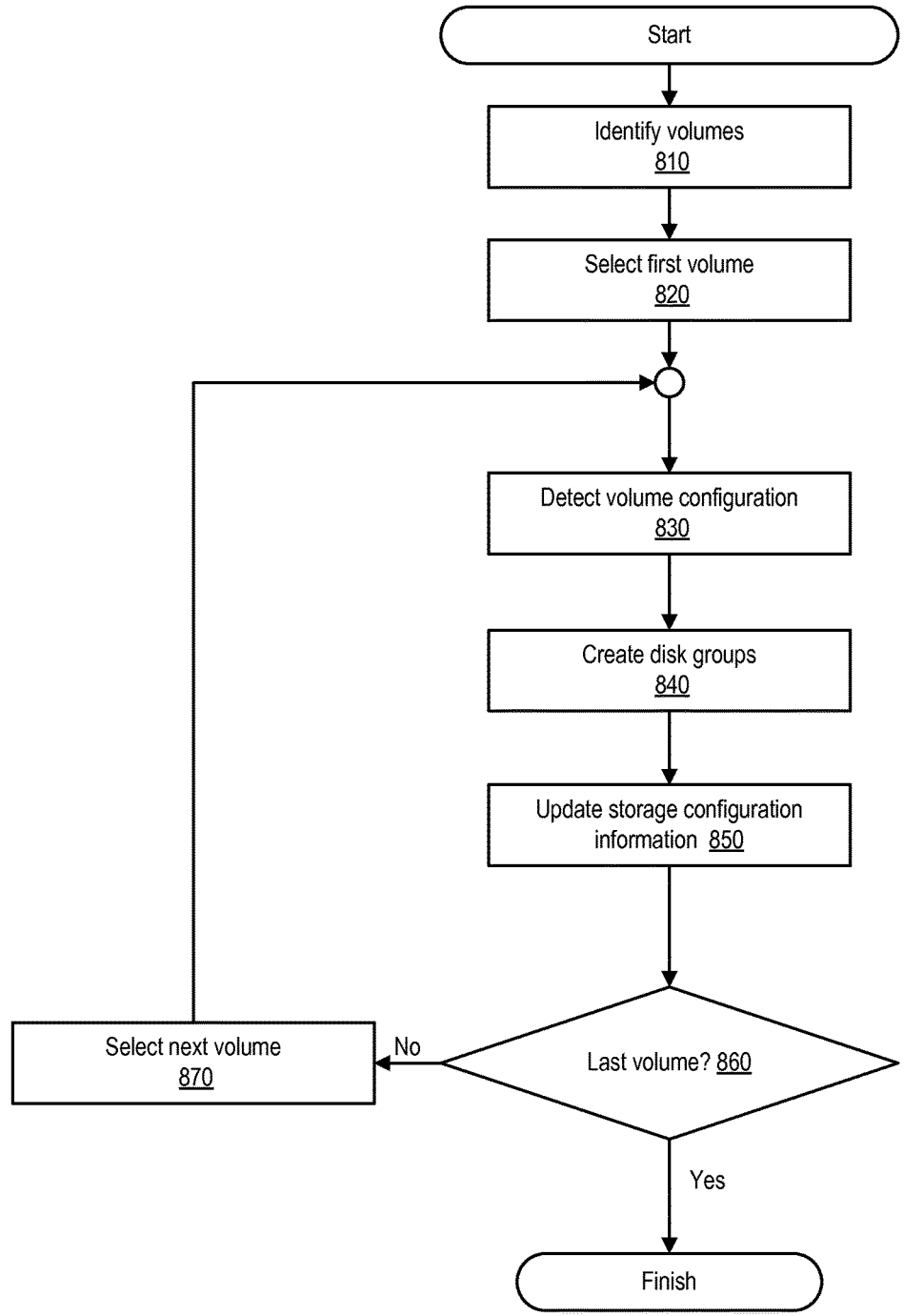
FIG. 8 is a flowchart of a method of configuring a storage system, according to one embodiment of the present invention.

FIG. 8 is flowchart of a method of configuring a storage system. The method can be performed by a storage management module, such as storage management module 122 of FIG. 1. The method can involve creating disk pools and/or updating storage configuration information, such as storage configuration information 124 of FIG. 1.

At 810, the storage management module identifies volumes, e.g., volumes 152 of FIG. 1, included in one or more storage networks which the storage management module manages. The storage management module stores information, e.g., a list, indicating which volumes are detected in the storage configuration information.

The storage management module selects a first volume at 820. At 830, the storage management module detects configuration information for the volume. For example, the storage management module can detect which flags are set for the volume, the size and available capacity of the volume, whether the volume is included in any groups, and the like.

The storage management module creates one or more groups of volumes, e.g., disk pools, at 840. In response to adding new volumes to an existing disk pool, the storage management module detects whether the properties of the new volume match the properties of the disk pool. If not, the storage management module does not add the volume to the disk pool. The storage management module can add multiple volumes to a disk pool. In one embodiment, the storage management module detects like volumes to be added to the disk pool.

A disk pool is a group of volumes that are homogeneous with respect to their properties, e.g., flag values. In one embodiment, the properties of the volumes within a disk pool determine the properties of the disk pool. In response to detecting the volume configuration, the storage management module can display discovered replication sources and replication targets for each volume to a user, e.g., a storage administrator. If each volume in the disk pool has a common replication target (e.g., same replication target), the storage management module can mark the disk pool as a replication source. If all volumes in a disk pool are valid replication targets, the storage management module can mark the disk pool as a replication target. Similarly if all volumes in a disk pool are sources of replication, the storage management module can mark the disk pool as a replication source.

In one embodiment, a disk pool that is used as a backup disk pool has the replication source and replication target flags set. A disk pool that is used as a snapshot disk pool has the primary flag, the replication source flag, the replication target flag, the mirror flag, and the independent flag set.

In one embodiment, the storage management module displays an initial change disk pool screen. The initial change disk pool screen displays the existing volumes in the disk pool and the properties of the volumes and the disk pool. The display includes a refresh device properties button. In response to a user selecting the refresh device properties button, the storage management module can update the display to refresh the disk volume properties with the volume properties. If the properties of the volumes do not change, the disk pool properties remain unchanged.

In response to the storage management module detecting changes in properties of volumes, the storage management module takes appropriate action. If the properties of existing volumes change but are homogenous or the replication topology changes, the storage management module updates the presents the existing volumes with the new properties and the disk pool assumes the new properties of the enclosed volumes. The new volumes (matching the properties of existing volumes) can also be presented to a user via a graphical user interface. The storage management module can warn the user about the change. The user can update the disk pool and volumes with new properties. The user can also add new volumes to the disk pool. If the properties of existing volumes change such that they are inconsistent with properties of the disk pool, the storage management module can warn the user and the storage management module can prevent the user from updating the disk pool. If the storage management module detects a volume that does not appear in the list of existing volumes, the storage management module can warn the user and prevents the user from updating the disk pool. The storage management module can update the list of existing volumes by detecting new volumes that match the disk pool properties and also do not belong to another disk pool.

At 850, the storage management module updates the storage configuration information with information identifying the characteristics of the volume, and any groups the volume is included in. At 860, the storage management module detects whether additional volumes exist, e.g., whether the storage management module has updated the storage configuration information and/or grouped all volumes managed by the storage management module. If not, the storage management module selects the next volume at 870, and the method returns to 830.

Figure 9A:
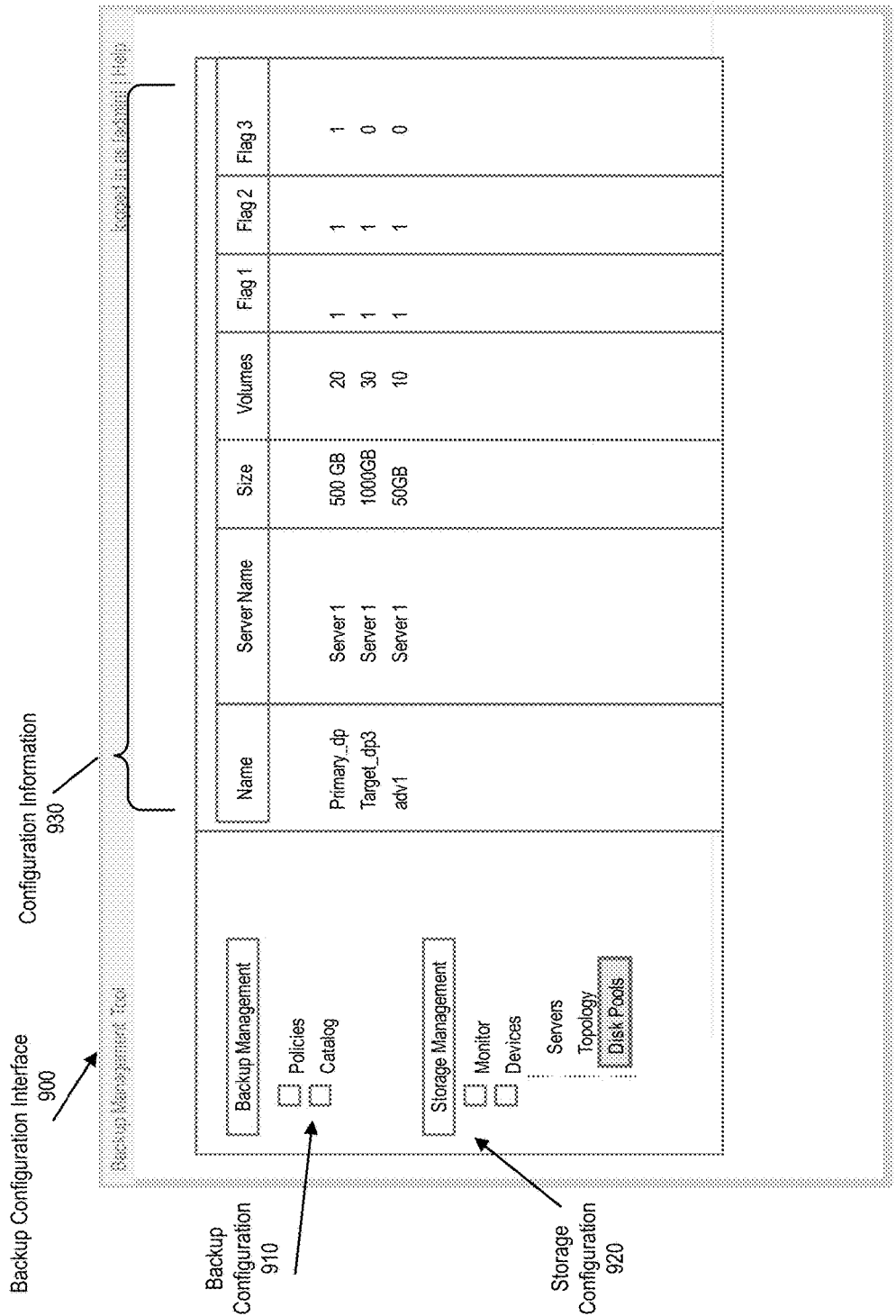
FIG. 9A is a block diagram of a backup configuration interface, according to one embodiment of the present invention.

FIG. 9A is a block diagram of a backup configuration interface 900. A user, e.g., a backup administrator, can use backup configuration interface 900 to configure and execute backup operations. Backup configuration interface 900 includes backup configuration 910, which is a section of the interface that allows a user to view and manipulate backup information. The backup information can include information identifying data that is available for backup, data that is scheduled to be backed up, or data that is being backed up. The backup information can also include specifications regarding how a backup operation is to be performed. Such information can include the type of backup, frequency of backup, and the like.

Using the backup configuration section of backup configuration interface 900, the backup module can be configured to execute backup operations, as discussed with regard to FIG. 7. Based on parameter values selected in this section of the interface, the backup module generates a set of backup instructions that are used to configure and perform a backup operation.

Backup configuration interface 900 also includes storage configuration 920, which is a section of the interface that allows a user to view and manipulate storage system information. As discussed with regard to FIG. 4, the backup module discovers storage system configuration information. This information is displayed using this section of the backup configuration interface.

The storage system information includes information received from a storage management module, such as storage management module 122 of FIG. 1. The information can include information regarding a replication topology and volumes included in the replication topology. The backup administrator can use this information to configure backup operations. The storage system information includes configuration information, such as configuration information 930. Configuration information 930 can include information identifying one or more volumes, groups of volumes, and information regarding the volumes' capabilities and configuration, e.g., whether the volumes can be configured to serve as replication targets for a given replication source in a given replication operation.

Figure 9B:
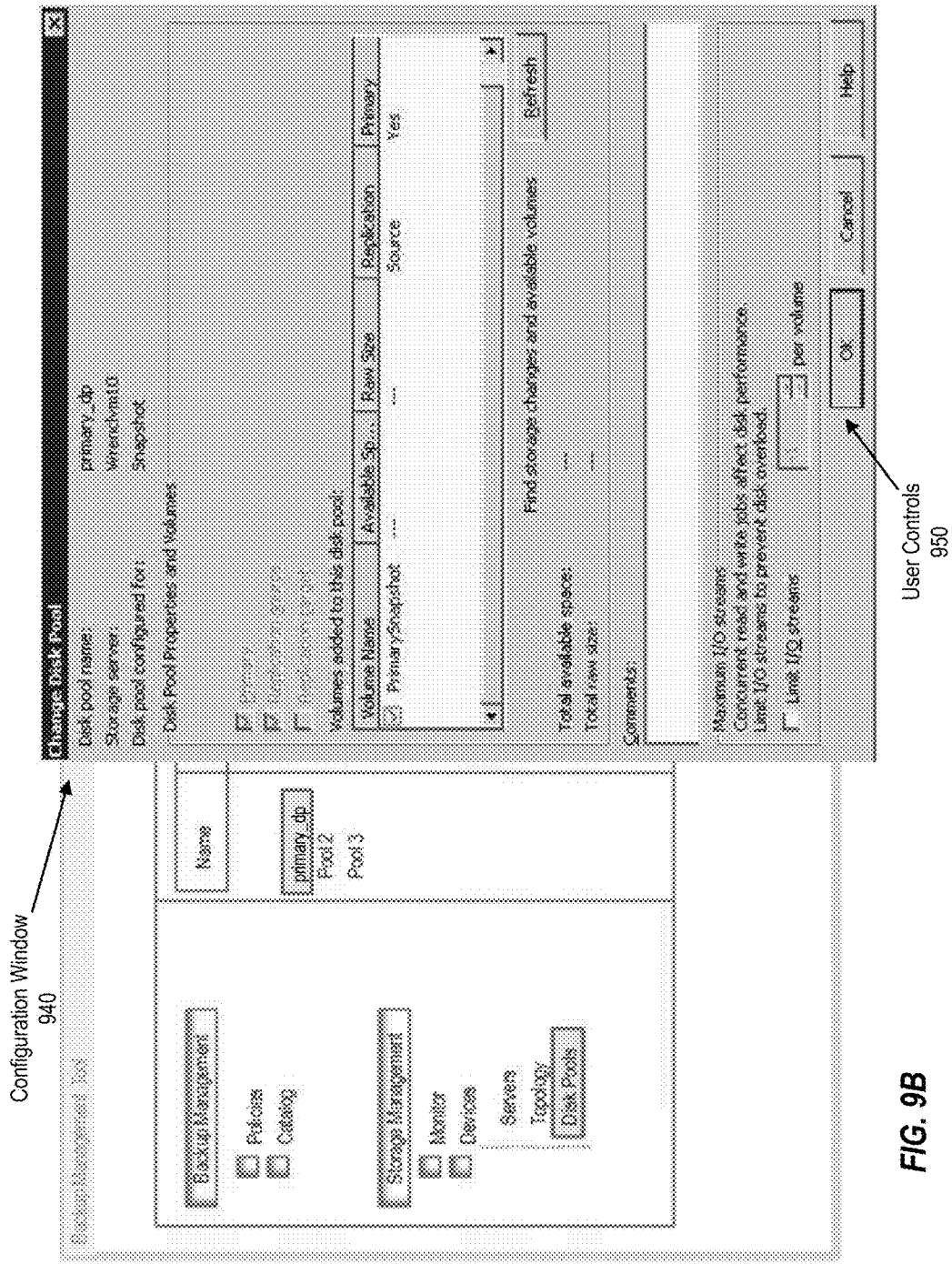
FIG. 9B is block diagram of a backup configuration interface showing additional details of a disk pool, according to one embodiment of the present invention.

FIG. 9B is block diagram of a backup configuration interface showing additional details of a disk group. As shown, a configuration window 940 can be configured to display additional details of a selected disk pool, including the disk pools replication configuration and capabilities, and information regarding what volumes are included in the disk pool. Configuration window 940 includes user controls 950 which a user can operate to accept or reject any changes made using configuration window 940.

As discussed with regard to FIG. 6, the backup module monitors the storage system. Using the backup configuration interface, the backup module can react to changes detected in the storage system configuration, e.g., by approving the changes and updating the storage system configuration information displayed by the backup configuration interface, or by disallowing the changes.

Figure 10:
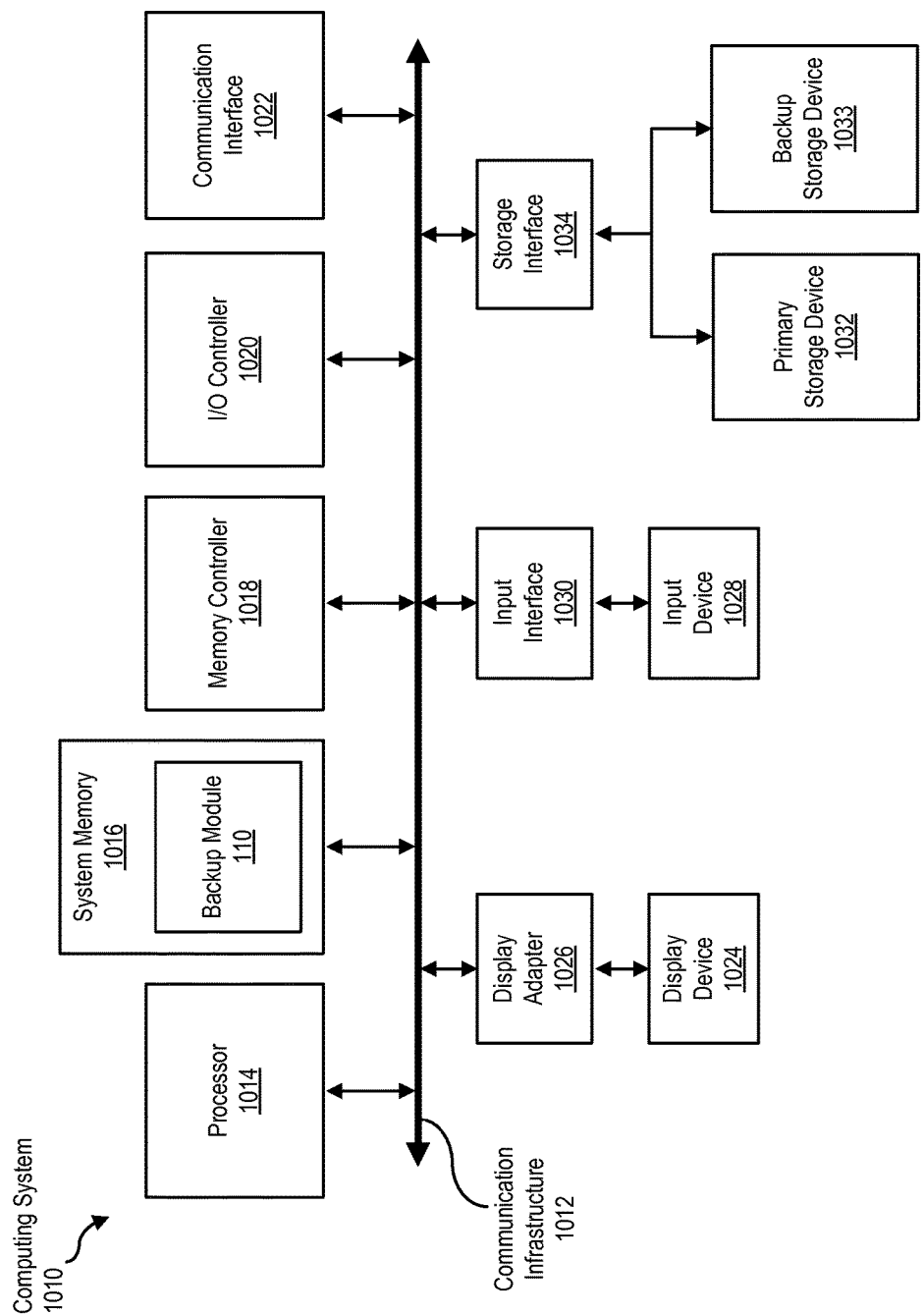
FIG. 10 is a block diagram of a computing device, illustrating how a backup module can be implemented in software, according to one embodiment of the present invention.

FIG. 10 is a block diagram of a computing system 1010 capable of configuring and performing backup operations using storage configuration information as described above. Computing system 1010 broadly represents any single or multi-processor computing device or system capable of executing computer-readable instructions. Examples of computing system 1010 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 1010 may include at least one processor 1014 and a system memory 1016. By executing the software that implements a backup module 110, computing system 1010 becomes a special purpose computing device that is configured to perform backup operations in the manner described above.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the embodiments described and/or illustrated herein. For example, processor 1014 may perform and/or be a means for performing the operations described herein. Processor 1014 may also perform and/or be a means for performing any other operations, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may include both a volatile memory unit (such as, for example, system memory 1016) and a non-volatile storage device (such as, for example, primary storage device 10102, as described in detail below). In one example, program instructions executable to implement a backup module 110 (e.g., as shown in FIG. 1) may be loaded into system memory 1016.

In certain embodiments, computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller 1018 may perform and/or be a means for performing, either alone or in combination with other elements, one or more of the operations or features described and/or illustrated herein.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 10100, and storage interface 10104.

Communication interface 1022 broadly represents any type or form of communication device or adapter capable of facilitating communication between computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11094 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1022 may also allow computing system 1010 to engage in distributed or remote computing. For example, communication interface 1022 may receive instructions from a remote device or send instructions to a remote device for execution.

As illustrated in FIG. 10, computing system 1010 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer) for display on display device 1024.

As illustrated in FIG. 10, computing system 1010 may also include at least one input device 1028 coupled to communication infrastructure 1012 via an input interface 10100. Input device 1028 generally represents any type or form of input device capable of providing input, either computer or human generated, to computing system 1010. Examples of input device 1028 include, without limitation, a keyboard, a pointing device, a speech recognition device, or any other input device.

As illustrated in FIG. 10, computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010. A storage device like primary storage device 1032 can store information such as deduplication signatures, backup images and/or a backup catalog.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10.

Computing system 1010 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1010 for storage in memory via a network such as the Internet or upon a carrier medium.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1010 may be configured as an application specific integrated circuit (ASIC) adapted to implement one or more of the embodiments disclosed herein.

Figure 11:
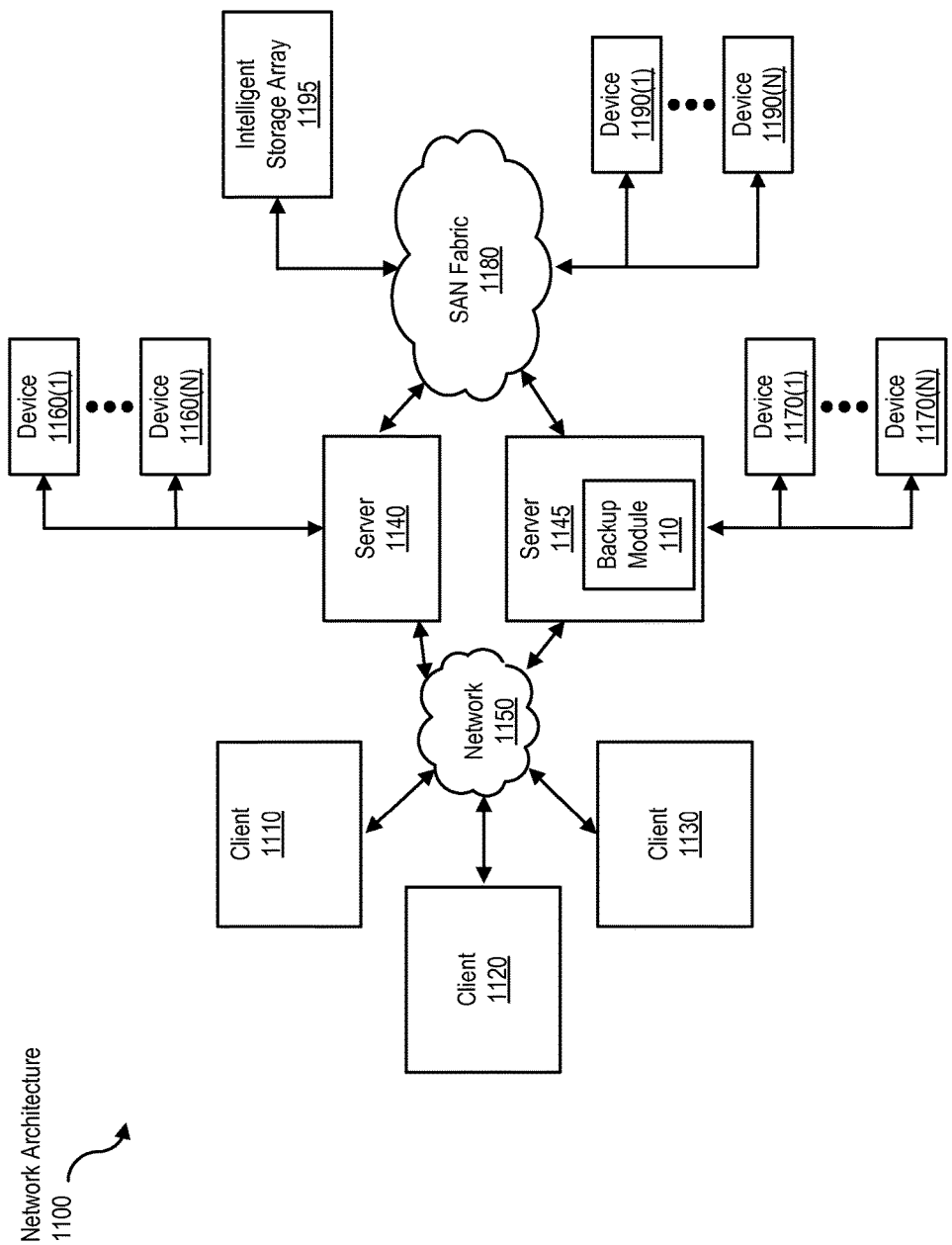
FIG. 11 is a block diagram of a networked system, illustrating how various computing devices can communicate via a network, according to one embodiment of the present invention.

FIG. 11 is a block diagram of a network architecture 1100 in which client systems 1110, 1120, and 1130 and servers 1140 and 1145 may be coupled to a network 1150. Client systems 1110, 1120, and 1130 generally represent any type or form of computing device or system, such as computing system 1010 in FIG. 10.

Similarly, servers 1140 and 1145 generally represent computing devices or systems, such as application servers or database servers, configured to provide various database services and/or run certain software applications. Network 1150 generally represents any telecommunication or computer network including, for example, an intranet, a wide area network (WAN), a local area network (LAN), a personal area network (PAN), or the Internet. In one example, one or more of client systems 1110, 1120, and/or 1130 may include a duplication module 134 as shown in FIG. 1.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent network-attached storage (NAS) devices configured to communicate with servers 1140 and 1145 using various protocols, such as Network File System (NFS), Server Message Block (SMB), or Common Internet File System (CIFS). Such storage devices can store backup information and storage configuration information, as described above.

Servers 1140 and 1145 may also be connected to a storage area network (SAN) fabric 1180. SAN fabric 1180 generally represents any type or form of computer network or architecture capable of facilitating communication between multiple storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 1140, server 1145, storage devices 1140(1)-(N), storage devices 1170(1)-(N), storage devices 1190(1)-(N), intelligent storage array 1195, or any combination thereof. All or a portion of one or more of the embodiments disclosed herein may also be encoded as a computer program, stored in server 1140, run by server 1145, and distributed to client systems 1110, 1120, and 1130 over network 1150.

In some examples, all or a portion of one of the systems in FIGS. 1, 10, and 11 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a duplication module may transform the behavior of a backup system such that backup image duplication operations can be scheduled to complete in a user-specified window.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving storage configuration information associated with a plurality of volumes at a backup system, wherein
      the backup system is configured to receive the storage configuration information from a storage system,
      the storage configuration information is created and maintained exclusively by the storage system separately from the backup system and the plurality of volumes, and
      the storage configuration information comprises replication topology information that describes one or more replication relationships between two or more of the plurality of volumes maintained by the storage system;
   configuring a backup operation to be performed using the plurality of volumes, wherein
      the configuring is performed by the backup system and is based on backup information and the storage configuration information, and
      the configuring comprises selecting a source volume from the plurality of volumes;
   selecting a target volume from the plurality of volumes, wherein
      the selecting is based on the storage configuration information; and
   initiating the backup operation in the storage system, wherein
      the initiating the backup operation comprises the backup system transmitting a command to the storage system,
      the command causes the storage system to perform the backup operation in response to receiving the command, and
      the backup operation comprises
         creating a backup image on the source volume, and
         replicating the backup image from the source volume to the target volume.

2. The method of claim 1, wherein
   the backup information comprises a service level agreement (SLA),
   the SLA comprises one or more data protection requirements, and
   the selecting is based, at least in part, on one or more data protection requirements.

3. The method of claim 2, further comprising:
   detecting whether the target volume supports a first type of replication, wherein
      the service level agreement specifies the first type of replication, and
      the detecting comprises reading a flag value.

4. The method of claim 1, further comprising:
   monitoring the backup operation; and
   requesting additional storage configuration information from a storage management server, wherein the storage management server is implemented separately and independently from the backup system and the storage system, and the requesting is performed in response to detecting that the backup operation has failed.

5. The method of claim 1, wherein
the storage configuration information identifies the one or more replication relationships between the source volume and the target volume.

6. The method of claim 1, wherein
the initiating is performed in response to receiving a backup request, and
the backup request specifies a replication attribute.

7. The method of claim 1, further comprising:
detecting a replication topology change, wherein
the storage configuration information is updated in response to the detecting the replication topology change; and
requesting additional storage configuration information in response to the detecting the replication topology change.

8. The method of claim 1, further comprising:
validating the target volume against the source volume, wherein
the validating comprises detecting a replication relationship between the target volume and the source volume.

9. The method of claim 1, further comprising:
displaying information identifying the target volume in response to the selecting the source volume.

10. The method of claim 1, further comprising:
receiving a query, wherein
the query comprises information identifying the source volume; and
displaying information identifying a portion of the storage configuration information in response to the receiving the query.

11. A non-transitory computer readable storage medium storing program instructions executable to:
receive storage configuration information associated with a plurality of volumes at a backup system, wherein
the backup system is configured to receive the storage configuration information from a storage system,
the storage configuration information is created and maintained exclusively by the storage system separately from the backup system and the plurality of volumes, and
the storage configuration information comprises replication topology information that describes one or more replication relationships between two or more of the plurality of volumes maintained by the storage system;
configure a backup operation to be performed using the plurality of volumes, wherein
configuring the backup operation is performed by the backup system and is based on backup information and the storage configuration information, and
configuring the backup operation comprises selecting a source volume from the plurality of volumes;
select a target volume from the plurality of volumes, wherein
selecting the target volume is based on the storage configuration information; and
initiate the backup operation in the storage system, wherein initiating the backup operation comprises the backup system transmitting a command to the storage system,
the command causes the storage system to perform the backup operation in response to receiving the command, and
the backup operation comprises
creating a backup image on the source volume, and
replicating the backup image from the source volume to the target volume.

12. The non-transitory computer readable storage medium of claim 11, wherein the instructions are further executable to:
monitor the backup operation; and
request additional storage configuration information from a storage management server, wherein
the storage management server is implemented separately and independently from the backup system and the storage system, and
requesting additional storage configuration information is performed in response to detecting that the backup operation has failed.

13. The non-transitory computer readable storage medium of claim 11, wherein
the storage configuration information identifies a replication relationship between the source volume and the target volume.

14. The non-transitory computer readable storage medium of claim 11, wherein the instructions are further executable to:
generate the storage configuration information, wherein
generating the storage configuration information is performed in response to a query from the backup system,
generating the storage configuration information comprises discovering a replication topology of the storage system, and
the storage system comprises the plurality of volumes.

15. The non-transitory computer readable storage medium of claim 11, wherein the instructions are further executable to:
detect a replication topology change, wherein
the storage configuration information is updated in response to detecting the replication topology change; and
request additional storage configuration information in response to detecting the replication topology change.

16. A system comprising:
one or more processors; and
a memory coupled to the one or more processors, wherein
the memory stores program instructions executable by the one or more processors to:
receive storage configuration information associated with a plurality of volumes at a backup system, wherein
the backup system is configured to receive the storage configuration information from a storage system,
the storage configuration information is created and maintained exclusively by the storage system separately from the backup system and the plurality of volumes, and
the storage configuration information comprises replication topology information that describes one or more replication relationships between two or more of the plurality of volumes maintained by the storage system;
configure a backup operation to be performed using the plurality of volumes, wherein configuring the backup operation is performed by the backup system and is based on backup information and the storage configuration information, and
configuring the backup operation comprises selecting a source volume from the plurality of volumes;
select a target volume from the plurality of volumes, wherein
selecting the target volume is based on the storage configuration information; and
initiate the backup operation in the storage system, wherein
initiating the backup operation comprises the backup system transmitting a command to the storage system,
the command causes the storage system to perform the backup operation in response to receiving the command, and
the backup operation comprises
creating a backup image on the source volume, and
replicating the backup image from the source volume to the target volume.

17. The system of claim 16, wherein the instructions are further executable to:
monitor the backup operation; and
request additional storage configuration information from a storage management server, wherein
the storage management server is implemented separately and independently from the backup system and the storage system, and
requesting additional storage configuration information is performed in response to detecting that the backup operation has failed.

18. The system of claim 16, wherein the instructions are further executable to:
generate the storage configuration information, wherein
generating the storage configuration information is performed in response to a query from the backup system,
generating the storage configuration information comprises discovering a replication topology of the storage system, and
the storage system comprises the plurality of volumes.

19. The system of claim 16, wherein the instructions are further executable to:
detect a replication topology change, wherein
the storage configuration information is updated in response to detecting the replication topology change; and
request additional storage configuration information in response to detecting the replication topology change.

20. The method of claim 1, wherein
the backup system is configured to detect a storage configuration change,
determine whether the storage configuration change affects a subsequent backup operations, and
update the storage configuration information in response to the determining.

21. The method of claim 1, wherein
a storage manager independently manages the storage system separately from the backup system, and
independently managing the storage system comprises storing the storage configuration information at a location that is separate from and inaccessible to the backup system, such that the backup system is unable to view the storage configuration information prior to the receiving.

\* \* \* \* \*